United States Patent Office 3,657,209

Patented Apr. 18, 1972

1

3,657,209

POLYMERIC MATERIAL AND METHOD OF PREPARING SAME

Earl J. Carlson and Samuel E. Horne, Jr., Akron, Ohio, assignors to Goodrich-Gulf Chemicals, Inc., Pittsburgh, Pa.

No Drawing. Filed Apr. 21, 1955, Ser. No. 503,028
Int. Cl. C08d 3/06
U.S. Cl. 260—94.3 5 Claims

ABSTRACT OF THE DISCLOSURE

This invention is concerned with the polymerization of butadiene in an inert liquid hydrocarbon in the presence of 0.5 to 20% by weight of butadiene of a catalyst comprising $TiCl_4$ and AlR′R″R‴.

This invention relates to a new polymeric material having a structure very different from heretofore known synthetic polymers. More particularly, this invention pertains to polybutadiene-1,3 in which the butadiene units are all present in the regular 1,4-all-trans structure, and to the preparation thereof by a polymerization technique involving the use of certain metal catalysts of an entirely different nature than catalysts previously used in diene polymerizations.

In the polymerization of butadiene-1,3 (hereinafter referred to as butadiene) there are various possible modes of union of the monomer units making up the polymer molecules. Addition polymerization may occur at the 1,4 carbon atoms to give 1,4 units (I) and addition may also take place at the 1,2 carbon atoms to produce 1,2 units (II). Further, the 1,4 units may exist in both cis (III) and trans (IV) configurations about the double bond

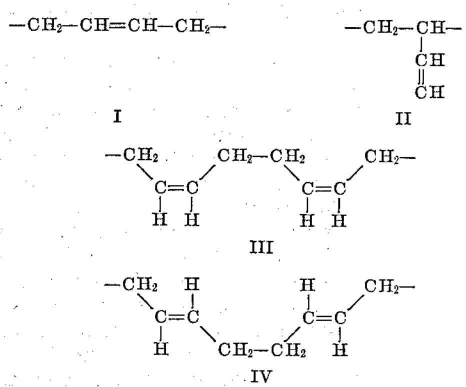

Over a period of many years the polymerization art has produced many olefinic and polyolefinic homopolymers, copolymers and interpolymers utilizing various polymerization systems and catalysts. Butadiene, for example, the simplest possible conjugated diolefin, is a constituent of many useful copolymers such as the rubbery butadiene-styrene copolymer (GR-S rubber) and the rubbery butadiene-acrylonitrile copolymer (oil-resistant nitrile rubber). Also, various butadiene homopolymers have been made and found to be desirable rubbery elastomeric materials, but all have been found to contain mixed cis 1,4; trans 1,4 and 1,2 structures. Until now every attempt to make a butadiene homopolymer with a uniform structure has been unsuccessful. The state of the art in this regard is summarized by Whitby in "Synthetic Rubber" published in 1954 by John Wiley & Sons at page 16 as follows:

"At present no techniques are known capable of insuring the presence of only a single kind of structural unit in diene polymers; all known techniques result in polymers in which cis 1,4-, trans 1,4- and 1,2-diene units occur."

2

Accordingly, a principal object of this invention is to prepare a new type of polymeric material of uniform structure.

Another object is to make a butadiene homopolymer having an all-trans 1,4 structure.

Still another object is to provide a new process for polymerizing butadiene, and, in particular, to provide novel, highly active catalysts for the polymerization of butadiene.

These and still further objects, including various secondary objects will become apparent from the description of the invention to follow.

In accordance with this invention butadiene is polymerized to form a polymer which is a high molecular weight 1,4, all-trans polybutadiene, by contact of monomeric butadiene with a catalyst (termed herein a heavy metal catalyst) prepared by the reaction between certain definite proportions of (1) a compound of a heavy metal occurring in the 4th to 10th positions of the long periods of the periodic table and (2) an organo-aluminum compound to be hereinafter defined, the reaction taking place in the absence of free oxygen and water. The exact nature of the catalyst so produced is not known with certainty, but it apparently contains a heavy metal-organo component.

The heavy metal compound used in preparing the heavy metal catalyst may be any compound of a metal occupying the 4th to 10th positions of the long periods of the periodic table in which the elements are arranged in short and long periods and the alkali metals occupy the first position (See Periodic Chart of the Elements on pages 342–343 of 33rd Edition of Handbook of Chemistry and Physics published 1951 by Chemical Rubber Publishing Co.). Such metals are those of periodic Groups IV–B, V–B, VI–B, VII–B and VIII including titanium, zirconium, hafnium, vanadium, niobium (columbium), tantalum, chromium, molybdenum, tungsten, manganese, masurium, rhenium, iron, ruthenium, osmium, cobalt, rhodium, iridium, nickel, palladium and platinum, as well as metals in corresponding positions in the last long period in the so-called "actinium series" such as thorium and uranium. The preferred heavy metal compounds are the salts of the formula $M(A)_n$ wherein M is the heavy metal atom, A is a monovalent anion and $n$ is the maximum valence of M. Especially preferred are the halides (chlorides, bromides, iodides and fluorides) and acetylacetonates of titanium, zirconium, thorium and uranium with titanium tetrachlroide being preferred. Other useful heavy metal compounds include other inorganic salts such as oxyhalides, sulfates, nitrates, sulfides and the like and other organic salts such as acetates and oxalates of the heavy metals of the above group.

As hereinabove stated, the heavy metal compounds disclosed in the next preceding paragraph are converted into the heavy metal catalysts by reaction with certain definite proportions of certain organo-aluminum compounds, the reaction being carried out in the absence of free oxygen and water, preferably in the absence of any materials other than the reactants involved and inert hydrocarbon solvents or diluents, and particularly in the absence of active hydrogen compounds such as alcohols, acids, amines, etc., as well as free oxygen and water.

The organo-aluminum compounds to be used possess the structure

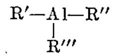

wherein R′ is a hydrocarbon radical, R″ is either another R′ radical or an —OR′ radical or a hydrogen, or halogen atom and R‴ is another R′ radical or hydrogen. The most preferred organo-aluminum compounds are aluminum trialkyls, $Al(R)_3$, wherein each R is an alkyl such as ethyl, propyl, butyl, isobutyl, amyl, hexyl, octyl, dodecyl, etc., or a substituted alkyl such as phenylethyl, 2-phenyl propyl, etc. Other organo-aluminum compounds are the alkyl aluminum hydrides $(R)_mAl(H)_n$ wherein R is the same as above and *m* and *n* are integers totaling 3; the dialkyl aluminum halides $R_2AlX$ wherein X is a halogen atom including chlorine, bromine, iodine and fluorine, and R is the same as above; the dialkyl aluminum alkoxides $R_2AlOR$ wherein R is the same as above; and the organo-aluminum compounds of the above-type formulae wherein R represents, in place of alkyl, an aryl group, such as phenyl, or a cycloalkyl group such as cyclohexyl or any other hydrocarbon group.

The reaction is carried out simply by mixing the heavy metal compound, most preferably titanium tetrachloride, and the organo-aluminum compound, most preferably a trialkyl aluminum, in proportions such as to provide substantially 2 to 1 molar amounts of heavy metal compound and aluminum compound, at any desired temperature, preferably at room temperature and, if desired, in the presence of an inert hydrocarbon diluent or solvent such as a saturated alkane, among which are butane, hexane, pentane, heptane, cetane or the like or mixtures thereof such as "Deobase" kerosene, or the mixture of alkanes resulting from the "Fischer-Tropsch" process, or a cycloalkane such as cyclohexane or methyl cyclohexane, or a benzene hydrocarbon such as benzene, toluene or xylene. It is important that the hydrocarbon solvent or diluent be free from oxygen and water, and also preferably from other impurities such as peroxides, sulfur compounds and compounds containing active hydrogen.

The reaction leading to the formation of the catalyst is generally rapid, slightly exothermic and is accompanied by the development of color in the reaction mixture. For example, when two moles of titanium tetrachloride are introduced into a benzene solution of one mole of triethyl aluminum, in the absence of oxygen and water, the solution assumes a dark color with formation of a brownish-black difficulty soluble material of unknown structure, but believed to be a compound of titanium in which some of the titanium exhibits a valence less than four. The resulting dark material is a typical heavy metal catalyst for use in this invention. A similar material is produced when there is used, in place of triethyl aluminum, a trialkyl aluminum in which the alkyl groups contain 4 or more carbon atoms such as triisobutyl aluminum, and this material is even more preferred since it has the advantage of being less flammable and safer to handle.

In order to produce an all-trans 1,4-polybutadiene with the heavy metal catalysts disclosed herein, it is essential that the relative proportions of heavy metal compound and of organo-aluminum compound used to prepare the catalyst be rather closely controlled. It is more desirable to use one mole of trialkyl aluminum compound for each two moles of heavy metal compound, preferably titanium tetrachloride, to give a molar ratio of heavy metal to aluminum of 2 to 1. However, it is possible to vary this ratio within limits of 1.5 to 1 to 3 to 1.

The process of the present invention involves the application of specific heavy metal catalysts to butadiene polymerization and the unexpected discovery that the butadiene polymerizes to give a polymer which is an all-trans 1,4 polybutadiene. The copending application of Carlin F. Gibbs et al., Ser. No. 503,027 filed Apr. 21, 1955 discloses a process involving the application of heavy metal catalysts to the polymerization of diolefins and is generic to the process of this invention.

In the practice of this invention the polymerization of butadiene is carried out by bringing monomeric butadiene, preferably in highly purified condition, in contact with the heavy metal catalyst, preferably in presence of a hydrocarbon solvent (the solvent being any of those hydrocarbons disclosed hereinabove as solvents or diluents for use in connection with preparation of the catalyst) and preferably in the absence of other materials, particularly oxidizing materials such as oxygen and peroxides, and materials containing active hydrogen atoms such as water, acids, alcohols, etc. Neither the temperature nor the pressure at which the butadiene is brought into contact with the catalyst is critical, it being possible to use temperature of room temperature or above or below and pressures of atmosperic or above or below atmospheric. Ordinarily it is preferred to introduce the monomeric butadiene into a colloidal solution or dispersion of the catalyst in hydrocarbon solvent, while maintaining an inert gas such as nitrogen over the solution or dispersion to avoid contact with air but without imposing any pressure other than that produced by the vapors of the materials present, and to maintain the colloidal solution or dispersion at a temperature of about −20 to 100° C., preferably about 5 to 50° C. Under these conditions the butadiene polymerizes, as evidenced by a gradual increase in viscosity of the reaction mixture, and by a moderate evolution of heat, in a period of about 30 minutes to 20 hours, generally 1 to 17 hours, to form a viscous homogeneous solution of the substantially all-trans 1,4 butadiene polymer in the hydrocarbon medium.

The relative amounts of hydrocarbon solvent, catalyst and butadiene monomer used in the polymerization process may be varied quite widely. It is desirable to use an amount of hydrocarbon solvent in excess of the amount of monomeric butadiene, for example, the use of 1 to 30, preferably 8 to 20 times as much hydrocarbon solvent as butadiene monomer by volume is suitable. The amount of catalyst is generally in the range of 0.5 to 20 percent by weight based on the weight of monomeric butadiene, the amount of catalyst being taken as the combined weight of the heavy metal compound and the organo-aluminum compound used in making the catalyst. As noted hereinabove the Ti/Al molar ratio of the two components used in making the catalyst is preferably at or near a ratio of 2 to 1.

After polymeriztaion to form a viscous solution of all-trans 1,4 polybutadiene polymer in hydrocarbon solvent, as described above, the polymer may be separated from the solvent and from catalyst residues by any of the conventional methods for yielding a solid polymer from a solution thereof. One preferred method consists in extracting the reaction solution several times with methyl alcohol to remove catalyst residues and then to add a solvent such as acetone which is miscible with the hydrocarbon solvent but in which the polymer is insoluble to precipitate the polymer. The polymer can then be washed on a wash mill, dried and otherwise processed in the usual manner.

The synthetic polybutadiene polymer as formed by the polymerization consists substantially entirely of long chain molecules each having the orderly all-trans 1,4 structure:

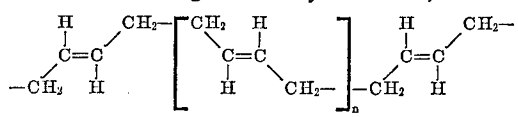

Since the polymer is formed in hydrocarbon solvent in the absence of oxygen, there is no opportunity for oxidation of molecules to occur until the polymer is isolated from the polymerization medium, but oxidation can then readily occur. In order to prevent this subsequent oxidation, it is desirable to add an antioxidant to the polymer while it is still in solution, this being conveniently done by including an antioxidant in the alcohol solution used to wash the rubber solution and free it from catalyst residues. Further antioxidant can be milled directly into the polymer in the absence of wash liquor, if desired. After precipitation of the polymer from the solution, the product is a solid unoxidized hydrocarbon polymer protected against oxidation by antioxidant molecules but essentially free of other types of molecules.

The molecular weight and molecular weight distribution of the hydrocarbon chain molecules in the polymer of this invention can be varied and controlled by changing monomer concentrations, solvents, catalyst ratios, and polymerization temperature and pressure conditions. In general, the molecular weights of the individual molecules of the all-trans 1,4 polybutadiene of this invention can range from 10,000 or lower to 1,500,000 or even higher.

In structure and properties the polybutadiene of this invention is very different from any heretofore known polymers produced by polymerization of monomeric butadiene. As regards structure, quotating again from "Synthetic Rubber" by Whitby, published 1954 by John Wiley & Sons on page 16, "The discovery of a mode of polymerization that will yield from butadiene polymer in which all the units are joined 1,4- and possess the same sterical configuration is a desideratum." The polybutadiene of this invention contains substantially no 1,2 addition and substantially no cis 1,4-addition, but is an all-trans 1,4 polybutadiene.

The trans polybutadiene of this invention has a stiff, boardy, leathery appearance somewhat resembling balata. Its structure is crystalline rather than amorphous. It can be vulcanized in the same manner as rubber and, unlike known butadiene polymers, it can readily be covulcanized with "butyl" rubber. It can be used for multifarious purposes and shows especial utility as an ingredient in shoe soles and uppers, luggare, golf ball covers, belting, tubeless tire sections, adhesives, upholstery, etc.

The polybutadiene of this invention and the process for its preparation are further illustrated and described in the following examples, which are intended in no way to limit the invention. Parts are by weight or volume with weight parts equal to volume parts multiplied by density.

EXAMPLE 1

There is added to 2,000 parts by volume of dewatered, deaerated benzene 72 parts (384 millimols) of anhydrous titanium tetrachloride and 37 parts (192 millimols) of triisobutyl aluminum. The solution, previously being at room temperature, warms up slightly and assumes a dark color due to reaction between the triisobutyl aluminum and the titanium tetrachloride. This catalyst solution is aged for 30 minutes at room temperature and then diluted to contain a total of 10,000 parts by volume of deaerated and dewatered benzene.

While maintaining the diluted catalyst solution under an atmosphere of nitrogen, either with or without agitation, there is added to the catalyst 1083 parts of liquid monomeric butadiene which is forced into the closed reactor by its own vapor pressure. Agitation is produced by a stirrer. The reactor is externally heated to 50° C., but during the course of the polymerization cooling water is required to keep the temperature down to 50° C., showing that an exothermic polymerization is occurring. The benzene solution becomes more and more viscous as time passes. After 17 hours the pressure in the reactor drops from 18 inches of mercury to a level of 6 inches of mercury, and cooling water is no longer required to prevent heat rise thus indicating the reaction is finished.

The polymer solution is blown with nitrogen pressure from the reactor to a wash tank where the polymer is precipitated and extracted with 4,000 parts by volume of methanol containing 10 parts of phenyl-beta-naphthylamine, a standard antioxidant. The extraction removes the catalyst residues. The polymer forms a swollen mass which is wash milled to sheet form. 10 parts of phenyl-beta-naphthylamine are added to the polymer on a dry wash mill and milled into the polymer mass. The washed stabilized polymer is sheeted off the mill and dried in a standard vacuum drier to a moisture content of practically zero. There is obtained 558 parts of dry polymer, equal to 51.5% yield on the monomer charged.

When the polybutadiene so produced is examined with the infrared spectrophotometer in the manner described by R. R. Hampton, Analytical Chemistry, August 1949, p. 923, it is found to possess a spectrum whose bands establish that the polybutadiene produced contains all of its butadiene units arranged in the trans 1,4 manner with substantially no butadiene units resulting from 1,2 addition or cis 1,4 addition.

The X-ray diffraction pattern of the raw polymer of this example shows a weak halo with an intense ring outside the halo plus two very weak rings farther out which is an indication or order and crystallinity.

The polymer is compounded in the following recipe:

| | |
|---|---|
| Trans 1,4 polybutadiene | 100 |
| Stearic acid | 2 |
| Zinc oxide | 5 |
| Sulfur | 2.5 |
| N - cyclohexyl - 2 - benzothiazole sulfenamide (accelerator) | 0.5 |
| Mercaptobenzothiazole (acceleator) | 0.5 |
| Lecithin | 2.3 |

This sample when cured 60 minutes at 325° F. gives the following results:

| | |
|---|---|
| Tensile (p.s.i.) | 1775 |
| Elongation (percent) | 400 |
| Gehman freeze point (° C.) | —28 |

The tensile strength of known homopolymers of butadiene is much lower than the above value for the trans 1,4 polybutadiene of this example.

The polymer of this example is compounded in admixture with "butyl" rubber according to the following recipe:

| | | |
|---|---|---|
| Trans 1,4 polybutadiene | 50 | 80 |
| "Butyl" rubber (isobutylene isoprene copolymer) | 50 | 20 |
| EPC black | 50 | 35 |
| Zinc oxide | 5 | 5 |
| Stearic acid | 3 | 3 |
| Tetramethyl thiuram disulfide | 1 | 1.5 |
| Mercaptobenzothiazole | | 0.17 |
| N-cyclohexyl-2-benzothiazole | | 0.17 |
| Sulfur | 2 | 1.75 |
| Magnesium oxide | | 1.0 |
| Lecithin | | 1.0 |

The composition is then vulcanized for 75 minutes at 320° F. and the vulcanizate is found to possess the following properties:

| | | |
|---|---|---|
| Tensile (p.s.i.) | 1,225 | 1,625 |
| Elongation (percent) | 25 | 125 |
| Shore Hardness | 95 | 85 |

It will be noted that the polymer of this invention covulcanizes with "butyl" rubber and, in this respect, differs from known butadiene polymers which do not have this property.

EXAMPLE 2

There is added to 150 parts by volume of dewatered, deaerated benzene at room temperature 0.99 part (5 millimols) of triisobutyl aluminum and 1.90 parts (10 millimols) of titanium tetrachloride. This catalyst solution (slightly warm and colored) is aged for 30 minutes, then diluted with dewatered, deaerated benzene to a total of 520 parts by volume. 53 parts of liquid, monomertic butadiene are added to the catalyst and the reactor is agitated for four hours at a controlled temperature of 5° C. The polymer solution is extracted with 1,000 parts by volume of methanol to precipitate the polymer and extract the catalyst. After a second wash with 1,000 parts by volume of acetone, the polymer is wash milled, 1½% by weight of polymer of phenyl-beta-naphthylamine is milled into the polymer, and it is then sheeted off the mill and vacuum dried. A good yield of an all-trans 1,4 polybutadiene similar to that of Example 1 but possessing a considerably higher molecular weight is obtained.

EXAMPLE 3

The procedure of Example 2 is followed except that the polymerization temperature is held at 50° C., and the amounts of heavy metal compound and alkyl aluminum used are such that the ratio of titanium to aluminum is equimolecular. 2.74 parts (14.5 millimols) of titanium tetrachloride and 2.88 parts (14.5 millimols) of triisobutyl aluminum are used. A rubbery polymeric butadiene is obtained in 60% yield after 17 hours. When examined in the infrared spectrophotometer, this polymer is found to possess both cis and trans 1,4 structure.

EXAMPLE 4

Again the procedure of Example 2 is followed except that the polymerization is held at 50° C., and the amounts of heavy metal compound and alkyl aluminum used are such that the molar ratio of titanium to aluminum is 4 to 1. 1.90 parts (10 millimols) of titanium tetrachloride and 0.50 part (2.5 millimols) of alkyl aluminum are used. A 34% yield of polymer is obtained in 17 hours. The product is a hard, unsaturated resin, which when examined in the infrared spectrophotometer, indicates that it is an approximately 50/50 mixture of cis and trans 1,4 polybutadiene.

Examples 3 and 4 indicate that molar ratios of heavy metal compound to alkyl aluminum compound outside the 1.5 to 1 to 3 to 1 ratio in the catalyst do not yield the desired all-trans 1,4 polybutadiene.

EXAMPLES 5 TO 15

In these examples, trans 1,4 polybutadiene is produced using various heavy metal catalysts to replace the catalyst formed from triisobutyl aluminum and titanium tetrachloride, as illustrated in the first paragraph of Example 1. Otherwise the procedure is the same Example 1. A 2/1 molar ratio of heavy metal compound to organo-aluminum compound is used. The following table shows the heavy metal compound and the organo-aluminum compound:

| Example | Heavy metal compound | Organo-aluminum compound |
|---|---|---|
| 5 | $FeCl_3$ | Diethyl aluminum chloride. |
| 6 | $ZrCl_4$ | Dimethylıluminum methoxide. |
| 7 | $CrCl_3$ | Diethyl aluminum hydride. |
| 8 | $WCl_6$ | Diphenyl aluminum chloride. |
| 9 | Th acetylacetonate | Triethyl aluminum. |
| 10 | $VCl_4$ | Triethyl aluminum. |
| 11 | Cr acetylacetonate | Triethyl aluminum. |
| 12 | $TiCl_4$ | Tri-n-octyl aluminum. |
| 13 | Zr acetylacetonate | Triethyl aluminum. |
| 14 | V acetylacetonate | Tri-n-propyl aluminum. |
| 15 | $ZrI_4$ | Tri-n-octyl aluminum. |

EXAMPLES 16 TO 22

The procedure of Example 1 is again repeated using various solvents in place of benzene. The solvents used are as follows:

| Example: | Solvent |
|---|---|
| 16 | Deobase (distilled from 0.3% solution of diisobutyl aluminum hydride). |
| 17 | n-Butane (distilled from 0.5% solution of methyl aluminum iodide. |
| 18 | Cyclohexane (distilled from triisobutyl aluminum). |
| 19 | Methyl cyclopentane (distilled from triisobutyl aluminum). |
| 20 | Heptane. |
| 21 | Pentane. |
| 22 | Toluene. |

In each case the results are equivalent to those of Example 1.

It will be understood that modifications and variations from the procedure described in detail herein may be made in accordance with the usual knowledge of the man skilled in the art without departing from the invention. For example, the phenyl-beta-naphthylamine antioxidant used in examples may be replaced by any of the host of known rubber antioxidants including any of the well-known aromatic amine antioxidants such as alkylated diphenyl amines (for example, "Agerite Stalite") diphenyl amine acetone condensation products (for example, "BLE"), and any of the well-known phenolic antioxidants such as alkylated phenols and bis-phenols, etc. Still other modifications and variations will occur to those skilled in the art and are, unless otherwise indicated, within the spirit and scope of the invention as defined in the appended claims.

We claim:

1. The method which comprises polymerizing a monomeric material consisting essentially of monomeric butadiene-1,3 in an inert liquid hydrocarbon medium in the presence of 0.5 to 20 percent by weight based on the butadiene-1,3 of a polymerization catalyst prepared by mixing (a) titanium tetrachloride with (b) an organo aluminum compound of the structure

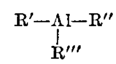

wherein R′ is a hydrocarbon radical, R″ is selected from the class consisting of hydrocarbon radicals and hydrogen and R‴ is selected from the class consisting of hydrocarbon radicals, oxyhydrocarbon radicals, hydrogen and halogen, the proportions of (a) and (b) being such as to provide a molar ratio of titanium to aluminum of about 1.5 to 1 to 3 to 1, thereby to produce a vulcanizable polybutadiene of molecular weight greater than 10,000 in which substantially all of the butadiene units are present in the trans-1,4 structure, and separating said trans-1,4-polybutadiene from said hydrocarbon medium.

2. The method of claim 1 wherein said organo aluminum compound is a trialkyl aluminum.

3. The method of claim 2 wherein said trialkyl aluminum is triisobutyl aluminum.

4. The method of claim 1 further characterized in that the molar ratio of titanium to aluminum is about 2 to 1.

5. The method which comprises polymerizing a monomeric material consisting essentially of monomeric butadiene-1,3 in an inert liquid hydrocarbon medium in the presence of a polymerization catalyst prepared by mixing (a) titanium tetrachloride with (b) a trialkyl aluminum compound, the proportions of (a) and (b) being such as to provide a molar ratio of titanium to aluminum of about 1.5 to 1.0 to 3.0 to 1.0.

References Cited

UNITED STATES PATENTS

| | | | |
|---|---|---|---|
| 2,352,979 | 7/1944 | Soday | 260—94.2 |
| 2,822,357 | 2/1958 | Brebnes et al. | 260—94.9 |
| 2,905,645 | 9/1959 | Anderson | 260—94.9 |
| 2,400,498 | 4/1948 | Young | 260—683.15 |
| 2,699,457 | 1/1955 | Ziegler et al. | 260—94.9 |
| 2,721,189 | 10/1955 | Anderson | 260—94.9 |

JOSEPH L. SCHOFER, Primary Examiner

R. A. GAITHER, Assistant Examiner

PO-1050
(5/69)

UNITED STATES PATENT OFFICE
CERTIFICATE OF CORRECTION

Patent No. 3,657,209 Dated April 18, 1972

Inventor(s) Samuel E. Horne, Jr. and Earl J. Carlson

It is certified that error appears in the above-identified patent and that said Letters Patent are hereby corrected as shown below:

Col. 1, line 40 of the formula "CH" should read --$CH_2$--.
Col. 2, line 50, correct spelling of "tetrachloride".
Col. 4, line 9, "ture" should read --tures--; correct spelling of "atmospheric" in line 10.
Col. 5, line 12, "quotating" should read --quoting--; line 28, correct spelling of "luggage".
Col. 6, line 10 "or" should read --of--; line 19 correct spelling of "accelerator"; line 32 insert after "is" --also--;
Col. 7, line 35 after "same" insert --as--; in the table Example 6 correct spelling of "aluminum".
Col. 8 in the references cited "2,400,498" should read --2,440,498--.

Signed and sealed this 5th day of September 1972.

(SEAL)
Attest:

EDWARD M.FLETCHER,JR.
Attesting Officer

ROBERT GOTTSCHALK
Commissioner of Patents